Oct. 21, 1958     J. T. BLAKE     2,857,566
FREQUENCY INDICATION SYSTEM
Filed Dec. 30, 1953
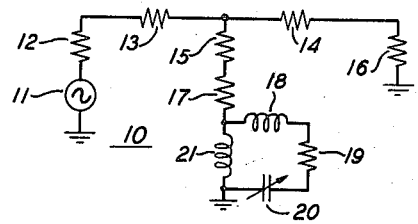
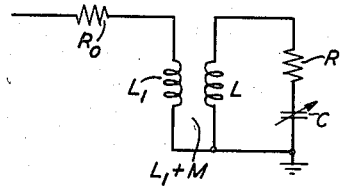
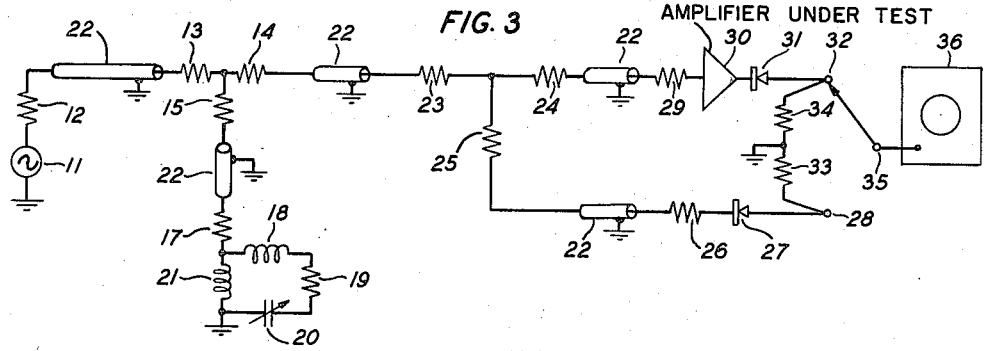
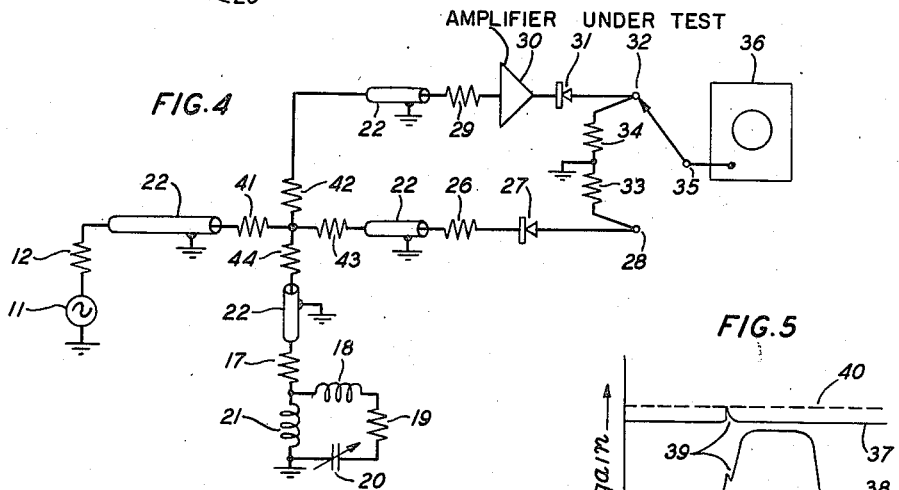
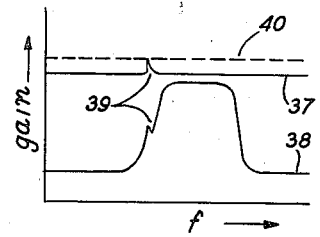
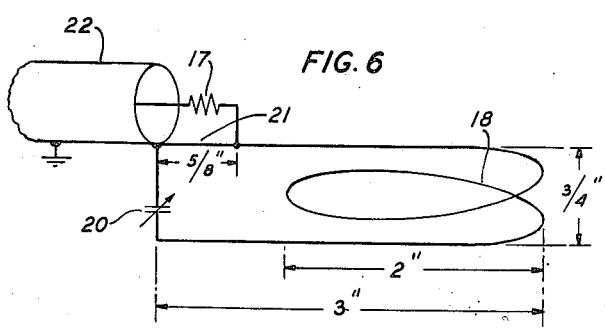
INVENTOR
J. T. BLAKE
BY
ATTORNEY

United States Patent Office 2,857,566
Patented Oct. 21, 1958

2,857,566

FREQUENCY INDICATION SYSTEM

John T. Blake, Irvington, N. J., assignor to Bell Telephone Laboratories, Incorporated, New York, N. Y., a corporation of New York Application December 30, 1953, Serial No. 401,195

1 Claim. (Cl. 324—57)

This invention relates to transmission measuring systems and particularly to frequency indication or marker circuits for use in transmission measuring systems.

One of the more commonly used frequency indication means employed in transmission lines is a wavemeter comprising a resonant circuit which absorbs energy from the transmission line at its resonant frequency thereby introducing an irregularity into the frequency characteristic of the transmitted signal. Through the use of a visual means such as an oscilloscope connected to the output terminal of the transmission line it is possible to directly observe the frequency-amplitude characteristic of the transmitted signal and the wavemeter imposed irregularity which appears as a pip thereon. Such an arrangement is particularly useful in determining, for example, the frequency-gain characteristic of an amplifier connected in the transmission line. Through the use of a calibrated variable frequency wavemeter the pip may be imposed successively at the lower end and at the upper limit of the visually observed frequency-gain characteristic of the amplifier and the effective band width of the amplifier in terms of frequencies may be determined directly from the respective wavemeter settings. While the absorption type of wavemeter is suitable for use in testing amplifiers having narrow frequency band characteristics, over broad frequency bands and particularly at the high frequency end of the band the amount of power absorbed by this type of wavemeter from the transmitted signal in the line becomes so large as to preclude any accurate determination of the characteristics of an amplifier that may be inserted into the line.

It is accordingly an object of this invention to provide a new and improved wavemeter adapted to operate as a frequency indicator over a broad frequency band.

A further object of the invention is to provide a wavemeter which introduces into the frequency-amplitude characteristic of any transmitted signal an irregularity which is substantially constant at every frequency in a broad band of frequencies.

The invention contemplates a variable frequency resonant arrangement that is shunt connected to a transmission line and impedance matched to the line at all frequencies except the resonant frequency. At the resonant frequency a mismatch occurs between the shunt arm and the transmission line and power is reflected from the shunt arm into the transmission line at that frequency. By calibrating the resonant arrangement for frequency, a means is provided for indicating a given frequency in the transmitted signal. In one exemplary embodiment of the invention the resonant arrangement comprises an inductive-capacitive parallel-tuned circuit which is lightly coupled to the shunt line through an inductance.

One important advantage of the invention is that energy is reflected into transmission line by the impedance mismatch at the resonant frequency thereby actually increasing the power delivered to the load at the marker frequency and providing a marker that contrasts itself with absorption type pips normally used in amplifier testing arrangements to set off band limits.

Another important advantage of the invention is that the energy reflected into the load is substantially constant at every frequency in a broad band of frequencies thereby permitting easy identification of the frequency marker in the transmitted frequency characteristics.

The invention, its objects, and its advantages will be better understood by referring to the following description and the drawings forming a part thereof wherein:

Fig. 1 is a circuit diagram in schematic form illustrating the principles of a wavemeter in accordance with the invention;

Fig. 2 is a schematic representation of the equivalent circuit of the wavemeter in accordance with the invention;

Fig. 3 is a circuit diagram in schematic form of a frequency indication system according to the invention as used in actual practice;

Fig. 4 shows an alternative arrangement of Fig. 2;

Fig. 5 is a graph useful in describing the operation of arrangements of Figs. 3 and 4; and Fig. 6 shows in schematic form an actual wavemeter constructed in accordance with the invention.

Referring particularly to Fig. 1 there is shown therein a frequency indication system 10 illustrating the principles of the invention comprising a signal generator 11 having a characteristic impedance $R_0$ represented by resistor 12, a three-arm matched impedance junction including resistors 13, 14 and 15, a load resistor 16 and a shunt arm including a resistor 17 and a parallel tuned resonant circuit comprising inductor 18, resistor 19 and variable capacitor 20 inductively coupled to the shunt arm through inductor 21. Resistors 16 and 17 are each chosen to be of an impedance $R_0$ and resistors 13, 14 and 15 are each of an impedance $$\frac{R_0}{3}$$

An equivalent electrical circuit of the shunt arm is shown in Fig. 2 where $R_0$ is the value of resistor 17, L is the value of inductor 18, R the value of resistor 19, C the value of capacitor 20, $L_1$ the value of inductor 21 and M the mutual inductance of L and $L_1$.

In the description of the operation of the system of Fig. 1 that follows the resonant frequency $\omega_0$ and the Q of the resonant circuit are defined as:

$$\omega_0 = \frac{1}{\sqrt{LC}} \quad (1)$$

$$Q = \frac{\omega_0 L}{R} > 100 \quad (2)$$

where R represents a circuit loss that varies as a function of frequency.

Power is sent into the junction from generator 11; one-half of the power is absorbed in the junction and one-quarter of the power is delivered to each of the other arms one including resistor 16 and the other including resistor 17. At the non-resonant frequencies of the parallel-tuned resonant circuit the power remains distributed in the arms as described above, but at the resonant frequency the impedance of the shunt arm mismatches that of the junction and some of the power in the shunt arm is reflected from that arm and appears in the load resistor 16. The power delivered to the load at the resonant frequency is increased by a factor of $$\left(1 + \frac{|\Gamma|^2}{4}\right) \quad (3)$$

where $\Gamma$ is the reflection coefficient of the system. The reflection coefficient is defined as:

$$\Gamma = \frac{R_0 - (R_0 + Z)}{R_0 + (R_0 + Z)} \quad (4)$$

where Z is the impedance of the resonant circuit at the resonant frequency $\omega_0$. Z is zero at all other frequencies.

From the equivalent circuit of Fig. 2, it can be shown that for the case in which $$L_1 \ll L$$

Z can be expressed as:

$$Z \doteq (\omega_0 Q) L_1 K^2 \quad (5)$$

where K is the coefficient of coupling expressed as:

$$K = \frac{M + L_1}{\sqrt{L_1 L}}$$

Hence it can be seen that for the case described above the coefficient of reflection $\Gamma$ of Equation 4 is a function of $(\omega_0 Q)$, and Q, as seen from Equation 2, is a function of frequency and circuit losses.

However, it has been discovered that by making the inductors in the circuit of a conductor such as, by way of illustration, solid copper wire the circuit losses over certain frequency ranges are adjusted so that Q may be expressed by the relationship $$Q \approx \frac{1}{\omega_0} \quad (6)$$

In such a frequency range it is apparent then that the impedance Z of Equation 5 will become independent of $\omega_0$ and Q, and may be expressed as a constant at any resonant frequency within the frequency range. Accordingly, the coefficient of reflection $\Gamma$ may also be expressed as a constant and the power reflected into the load will be constant for any resonant frequency in the selected frequency range. This then is a wavemeter which produces a frequency marker of increased power which marker is of a constant amplitude at any frequency in a broad band of frequencies.

Fig. 3 shows in schematic form a frequency indication system embodying the principles of the invention as used in actual practice. Fig. 3 shows the circuit of Fig. 1 here connected to an oscilloscope for use in determining the frequency band of an amplifier which connection is the equivalent of load resistor 16 of Fig. 1. The transmission lines connecting the circuit elements are shown as coaxial line segments 22. The junction arm resistor 14 is connected through a coaxial line to one arm of a second three-arm junction comprising resistors 23, 24 and 25 each of an impedance $$\frac{R_0}{3}$$

The other two arms of the junction are connected as follows: one through a coaxial line, a load resistor 26 of an impedance $R_0$ and an R. F. rectifier 27 to a terminal 28 and the other through a coaxial line, a load resistor 29, an amplifier to be tested 30 and an R. F. rectifier 31 to a terminal 32. The terminals 28 and 32 are connected through balancing resistors 33 and 34 respectively to ground. A high frequency switch 35 connected to an oscilloscope 36 of any well known type is adjusted to switch alternately between terminals 28 and 32. Switch 35 may be of any suitable type, such as, for example, a fast acting relay, or an electronic switch. As a result of the action of switch 35 there appears on the face of the oscilloscope represented by Fig. 5 a gain-frequency pattern 37 representative of the output of generator 11 and a gain-frequency pattern 38 representative of transmission characteristic of the amplifier 30. A pip 39 representative of the power reflected into the load at the resonant frequency of the resonant circuit is produced in both of the gain-frequency patterns. The resonant frequency may be adjusted to any frequency in the selected frequency band by tuning capacitor 20 and the pip produced has a constant size over the band as shown by dashed line 40.

An alternative arrangement of the frequency indication system of Fig. 3 is shown in Fig. 4. Instead of using two three-arm junctions to provide for the insertion of the frequency marker and transmission of the generated signals to the oscilloscope as in Fig. 3, one four-arm matched junction is utilized. The arms of the junction comprise resistors 41, 42, 43 and 44 respectively and are each of an impedance $$\frac{R_0}{2}$$

The arms of the junction are connected respectively to the generator 11, the circuitry associated with terminal 32, the circuitry associated with terminal 28 and the shunt arm including resistor 17.

A wavemeter circuit used in actual practice in the frequency indicator system of Fig. 3 and which provides a constant 0.1 decibel pip over a range of 35 to 105 megacycles is shown in Fig. 6 and the values used for the circuit elements are:

17_____75 ohms.
18_____2 turns No. 14 A. W. G. copper wire 2" x ¾".
20_____8–100 micro-microfarads.
21_____⅝" of No. 14 A. W. G. copper wire.

It is understood that the above-described arrangements are merely illustrative of the application of the principles of the invention. Obviously, the principles can be applied to microwave transmission by connecting a suitable resonant element through a shunt stub to a wave guide. Numerous other arrangements might be devised by those skilled in the art without departing from the spirit or scope of the invention.

What is claimed is:

A transmission measuring system comprising a signal generator, a load circuit including apparatus under test and having an input impedance substantially equal to the impedance of said generator, a passive marker generator including an antiresonant circuit tunable over the frequency range of said generator and having an impedance at the nonresonant frequencies of said antiresonant circuit substantially equal to the impedance of said signal generator, and a branching network interconnecting said signal generator, said load circuit, and said marker generator and including an impedance element in series with each of those circuits, said impedance elements having such values that for all frequencies in the range of said generator except the resonant frequency of said antiresonant circuit the impedances of said signal and marker generators and said load circuit are substantially matched and at said resonant frequency energy is reflected from the marker generator arm to the load.

References Cited in the file of this patent

UNITED STATES PATENTS

| | | |
|---|---|---|
| 2,087,652 | Oakley | July 20, 1937 |
| 2,498,548 | Howard | Feb. 21, 1950 |
| 2,594,091 | Summerhayes | Apr. 22, 1952 |
| 2,626,980 | Balde et al. | Jan. 27, 1953 |
| 2,651,940 | Kline | Sept. 15, 1953 |
| 2,677,804 | Foster | May 4, 1954 |
| 2,763,835 | Lundgren | Sept. 18, 1956 |

OTHER REFERENCES

"Receiver Bandwidth and Its Measurement," article in Audio Engineering of January 1951—pages 18, 19, 46, 47; by Howard T. Sterling and Alan Sobel.